(12) United States Patent
Ziegler

(10) Patent No.: US 9,230,305 B2
(45) Date of Patent: Jan. 5, 2016

(54) SUMMED AREA COMPUTATION USING RIPMAP OF PARTIAL SUMS

(71) Applicant: NVIDIA Corporation, Santa Clara, CA (US)

(72) Inventor: Gernot Ziegler, Vienna (AT)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 13/732,315

(22) Filed: Dec. 31, 2012

(65) Prior Publication Data

US 2014/0185951 A1   Jul. 3, 2014

(51) Int. Cl.
*G06K 9/00* (2006.01)
*G06T 5/00* (2006.01)
*G06T 5/20* (2006.01)

(52) U.S. Cl.
CPC . *G06T 5/003* (2013.01); *G06T 5/20* (2013.01); *G06T 2207/10024* (2013.01)

(58) Field of Classification Search
None
See application file for complete search history.

(56) References Cited

U.S. PATENT DOCUMENTS

| | | | |
|---|---|---|---|
| 5,542,054 A * | 7/1996 | Batten, Jr. | 706/26 |
| 5,629,929 A * | 5/1997 | Blanchard et al. | 370/201 |
| 5,831,640 A | 11/1998 | Wang et al. | |
| 5,835,097 A | 11/1998 | Vaswani et al. | |
| 5,841,442 A | 11/1998 | Einkauf et al. | |
| 6,052,127 A | 4/2000 | Vaswani et al. | |
| 6,184,893 B1 | 2/2001 | Devic et al. | |
| 6,466,223 B1 * | 10/2002 | Dorbie et al. | 345/582 |
| 6,876,362 B1 | 4/2005 | Newhall, Jr. et al. | |
| 7,525,551 B1 * | 4/2009 | Newhall et al. | 345/587 |
| 7,961,195 B1 | 6/2011 | Rogers et al. | |
| 8,648,856 B2 | 2/2014 | Newhall, Jr. et al. | |
| 8,803,879 B1 | 8/2014 | Newhall, Jr. et al. | |
| 9,081,681 B1 | 7/2015 | Donovan | |
| 2004/0073768 A1 * | 4/2004 | Bottemiller et al. | 711/207 |
| 2006/0088444 A1 * | 4/2006 | Gambini et al. | 422/82.08 |
| 2009/0310888 A1 * | 12/2009 | Szeliski et al. | 382/298 |

* cited by examiner

*Primary Examiner* — Eueng-Nan Yeh

(57) ABSTRACT

Methods are provided to perform area summation of various subsections of data values in a regular input array of one or several dimensions and varying sizes. The summation is achieved by adding up values from a ripmap of partial sums, where the partial sums are computed from the input array using a binary reduction method. According to such embodiments, the generation of the ripmap of partial sums will employ several binary reduction stages. Within each stage, a reduction operator is used that adds two elements along the respective direction. This is repeated until the output is only one element wide in the respective direction. The addresses of partial sums in the ripmap may subsequently be computed using a binary analysis of the target subsections in order to choose those partial sum values for a desired area that results in the desired area sum using an optimal number of data fetches.

36 Claims, 14 Drawing Sheets

| 29 |||||||||||||||| 
|---|---|---|---|---|---|---|---|---|---|---|---|---|---|---|---|
| 14 |||||||| 15 ||||||||
| 10 |||||| 4 |||| 12 |||| 3 ||||
| 5 ||| 5 ||| 1 || 3 || 5 || 7 || 3 || 0 ||
| 5 | 0 | 2 | 3 | 1 | 0 | 0 | 3 | 0 | 5 | 0 | 7 | 1 | 2 | 0 | 0 |

| 0 | 0 | 0 | 0 | 1 | 0 | 0 | 0 |
|---|---|---|---|---|---|---|---|
| 0 | 0 | 0 | 7 | 0 | 1 | 0 | 0 |
| 0 | 1 | 1 | 0 | 0 | 0 | 1 | 0 |
| 0 | 0 | 0 | 0 | 0 | 0 | 1 | 0 |
| 3 | 0 | 0 | 0 | 0 | 0 | 1 | 0 |
| 2 | 1 | 1 | 0 | 0 | 5 | 1 | 0 |
| 0 | 0 | 0 | 0 | 0 | 1 | 0 | 0 |
| 0 | 0 | 0 | 0 | 1 | 0 | 0 | 0 |

| 0 | 0 | 2 | 3 | 0 | 0 | 0 | 0 | 0 | 5 | 0 | 0 | 5 | 0 | 5 |
|---|---|---|---|---|---|---|---|---|---|---|---|---|---|---|
| 0 | 0 | 1 | 0 | 0 | 1 | 0 | 0 | 0 | 1 | 1 | 0 | 1 | 1 | 2 |
| 0 | 0 | 1 | 0 | 0 | 1 | 0 | 0 | 0 | 1 | 1 | 0 | 1 | 1 | 2 |
| 0 | 0 | 0 | 0 | 0 | 0 | 7 | 0 | 0 | 0 | 0 | 7 | 0 | 7 | 7 |
| 1 | 0 | 0 | 0 | 0 | 0 | 0 | 1 | 1 | 0 | 0 | 1 | 1 | 1 | 2 |
| 0 | 1 | 5 | 0 | 0 | 0 | 1 | 0 | 1 | 5 | 0 | 1 | 6 | 1 | 7 |
| 0 | 0 | 1 | 1 | 1 | 1 | 0 | 0 | 0 | 2 | 2 | 0 | 2 | 2 | 4 |
| 0 | 0 | 0 | 0 | 0 | 0 | 0 | 0 | 0 | 0 | 0 | 0 | 0 | 0 | 0 |

1001

↓

| 0 | 0 | 3 | 3 | 0 | 1 | 0 | 0 | 0 | 6 | 1 | 0 | 6 | 1 | 7 |
|---|---|---|---|---|---|---|---|---|---|---|---|---|---|---|
| 0 | 0 | 1 | 0 | 0 | 1 | 7 | 0 | 0 | 1 | 1 | 7 | 1 | 8 | 9 |
| 1 | 1 | 5 | 0 | 0 | 0 | 1 | 1 | 2 | 5 | 0 | 2 | 7 | 2 | 9 |
| 0 | 0 | 1 | 1 | 1 | 1 | 0 | 0 | 0 | 2 | 2 | 0 | 2 | 2 | 4 |

1003

↓

| 0 | 0 | 4 | 3 | 0 | 2 | 7 | 0 | 0 | 7 | 2 | 7 | 7 | 9 | 16 |
|---|---|---|---|---|---|---|---|---|---|---|---|---|---|---|
| 1 | 1 | 6 | 1 | 1 | 1 | 1 | 1 | 2 | 7 | 2 | 2 | 9 | 4 | 13 |

1005

↓

| 1 | 1 | 10 | 4 | 1 | 3 | 8 | 1 | 2 | 14 | 4 | 9 | 16 | 13 | 29 |
|---|---|---|---|---|---|---|---|---|---|---|---|---|---|---|

| 0 | 0 | 2 | 3 | 0 | 0 | 0 | 0 |
|---|---|---|---|---|---|---|---|
| 0 | 0 | 1 | 0 | 0 | 1 | 0 | 0 |
| 0 | 0 | 1 | 0 | 0 | 1 | 0 | 0 |
| 0 | 0 | 0 | 0 | 0 | 0 | 7 | 0 |
| 1 | 0 | 0 | 0 | 0 | 0 | 0 | 1 |
| 0 | 1 | 5 | 0 | 0 | 0 | 1 | 0 |
| 0 | 0 | 1 | 1 | 1 | 1 | 0 | 0 |
| 0 | 0 | 0 | 0 | 0 | 0 | 0 | 0 |

1103

| 0 | 5 | 0 | 0 | 5 | 0 | 5 |
|---|---|---|---|---|---|---|
| 0 | 1 | 1 | 0 | 1 | 1 | 2 |
| 0 | 1 | 1 | 0 | 1 | 1 | 2 |
| 0 | 0 | 0 | 7 | 0 | 7 | 7 |
| 1 | 0 | 0 | 1 | 1 | 1 | 2 |
| 1 | 5 | 0 | 1 | 6 | 1 | 7 |
| 0 | 2 | 2 | 0 | 2 | 2 | 4 |
| 0 | 0 | 0 | 0 | 0 | 0 | 0 |

1105

| 0 | 0 | 3 | 3 | 0 | 1 | 0 | 0 |
|---|---|---|---|---|---|---|---|
| 0 | 0 | 1 | 0 | 0 | 1 | 7 | 0 |
| 1 | 1 | 5 | 0 | 0 | 0 | 1 | 1 |
| 0 | 0 | 1 | 1 | 1 | 1 | 0 | 0 |
| 0 | 0 | 4 | 3 | 0 | 2 | 7 | 0 |
| 1 | 1 | 6 | 1 | 1 | 1 | 1 | 1 |
| 1 | 1 | 10 | 4 | 1 | 3 | 8 | 1 |

1107

| 0 | 6 | 1 | 0 | 6 | 1 | 7 |
|---|---|---|---|---|---|---|
| 0 | 1 | 1 | 7 | 1 | 8 | 9 |
| 2 | 5 | 0 | 2 | 7 | 2 | 9 |
| 0 | 2 | 2 | 0 | 2 | 2 | 4 |
| 0 | 7 | 2 | 7 | 7 | 9 | 16 |
| 2 | 7 | 2 | 2 | 9 | 4 | 13 |
| 2 | 14 | 4 | 9 | 16 | 13 | 29 |

| 0 | 0 | 2 | 3 | 0 | 0 | 0 | 0 |
|---|---|---|---|---|---|---|---|
| 0 | 0 | 1 | 0 | 0 | 1 | 0 | 0 |
| 0 | 0 | 1 | 0 | 0 | 1 | 0 | 0 |
| 0 | 0 | 0 | 0 | 0 | 0 | 7 | 0 |
| 1 | 0 | 0 | 0 | 0 | 0 | 0 | 1 |
| 0 | 1 | 5 | 0 | 0 | 0 | 1 | 0 |
| 0 | 0 | 1 | 1 | 1 | 1 | 0 | 0 |
| 0 | 0 | 0 | 0 | 0 | 0 | 0 | 0 |

1201

| 0 | 0 | 2 | 3 | 0 | 0 | 0 | 0 |
|---|---|---|---|---|---|---|---|
| 0 | 0 | 1 | 0 | 0 | 1 | 0 | 0 |
| 0 | 0 | 1 |   | 1 |   | 7 | 0 |
| 0 | 0 |   |   |   |   |   | 0 |
| 1 | 0 |   |   |   |   | 1 | 1 |
| 0 | 1 | 5 |   | 0 |   |   | 0 |
| 0 | 0 | 1 | 1 | 1 | 1 | 0 | 0 |
| 0 | 0 | 0 | 0 | 0 | 0 | 0 | 0 |

| 0 | 0 | 2 | 3 | 0 | 0 | 0 | 0 |
|---|---|---|---|---|---|---|---|
| 0 | 0 | 1 | 0 | 0 | 1 | 0 | 0 |
| 0 | 0 | 1 | 0 | 0 | 1 | 0 | 0 |
| 0 | 0 | 0 | 0 | 0 | 0 | 7 | 0 |
| 1 | 0 | 0 | 0 | 0 | 0 | 0 | 1 |
| 0 | 1 | 5 | 0 | 0 | 0 | 1 | 0 |
| 0 | 0 | 1 | 1 | 1 | 1 | 0 | 0 |
| 0 | 0 | 0 | 0 | 0 | 0 | 0 | 0 |

1303

| 0 | 5 | 0 | 0 | 5 | 0 | 5 |
|---|---|---|---|---|---|---|
| 0 | 1 | 1 | 0 | 1 | 1 | 2 |
| 0 | 1 | 1 | 0 | 1 | 1 | 2 |
| 0 | 0 | 0 | 7 | 0 | 7 | 7 |
| 1 | 0 | 0 | 1 | 1 | 1 | 2 |
| 1 | 5 | 0 | 1 | 6 | 1 | 7 |
| 0 | 2 | 2 | 0 | 2 | 2 | 4 |
| 0 | 0 | 0 | 0 | 0 | 0 | 0 |

| 0 | 0 | 3 | 3 | 0 | 1 | 0 | 0 |
|---|---|---|---|---|---|---|---|
| 0 | 0 | 1 | 0 | 0 | 1 | 7 | 0 |
| 1 | 1 | 5 | 0 | 0 | 0 | 1 | 1 |
| 0 | 0 | 1 | 1 | 1 | 1 | 0 | 0 |
| 0 | 0 | 4 | 3 | 0 | 2 | 7 | 0 |
| 1 | 1 | 6 | 1 | 1 | 1 | 1 | 1 |
| 1 | 1 | 10 | 4 | 1 | 3 | 8 | 1 |

1305

| 0 | 6 | 1 | 0 | 6 | 1 | 7 |
|---|---|---|---|---|---|---|
| 0 | 1 | 1 | 7 | 1 | 8 | 9 |
| 2 | 5 | 0 | 2 | 7 | 2 | 9 |
| 0 | 2 | 2 | 0 | 2 | 2 | 4 |
| 0 | 7 | 2 | 7 | 7 | 9 | 16 |
| 2 | 7 | 2 | 2 | 9 | 4 | 13 |
| 2 | 14 | 4 | 9 | 16 | 13 | 29 |

Exemplary Computer
System 1400

SUMMED AREA COMPUTATION USING RIPMAP OF PARTIAL SUMS

BACKGROUND

In the field of image processing, a common technique performed is to artificially blur an image with varying degrees for each pixel. This technique may be used to simulate a picture taken by a camera, or high contrast video processing, for example, where blurring may be artificially simulated for objects and textures in the image(s) which are determined to be farther away from the perspective of the viewer. In these cases, information corresponding to the intended depth may be calculated for each pixel in the image, and this information may be used to determine the extent of blurring performed on the pixel.

One practice for blurring with depth information is to reference the depth information (often a depth value) of the adjacent or surrounding pixels, average the color values in the group and apply a weighted offset to the color value of the pixel based on the resultant averaged color of the surrounding pixels. This would result in an artificially created "blurriness" effect in larger areas further away from the viewer's perspective. The color values are often implemented as arrays of values, typically floating points or integers. A common optimization is to use Summed Area Tables to perform the summation and averaging of the color values, effectively generating a Prefix Sum of the input values which originates at a corner of the input array.

A summed area table (also known as an integral image) is a data structure and algorithm for calculating the sum of values in a target subsection (area) of an array or grid. A summed area computation operates on a one-to-multidimensional regular data array and sums up a rectangular array of values. FIG. 1 depicts a conventional summed area table for a one dimensional array of input. As depicted in FIG. 1, a summed area table 103 may be pre-generated from an array of input 101 by pre-computing the sum of all previous elements in the array and storing the resultant data in another array, using a one-to-one correspondence. Computing the sum of a contiguous subset of the array therefore, may be performed by subtracting the value corresponding to the starting index of the subset from the value at the end index of the subset to determine the integral sum between the two indices. An averaging operation can subsequently be applied to the ensuing sum by dividing by the number of elements.

In addition to video and image processing, another popular application for summed area computation and/or artificial blurring is within the field of 3 D video gaming, as closer objects are graphically represented as being less blurred than objects farther away. Other fields which may employ summed area computation include probability calculation, specifically, to calculate the probability in a certain span of an input event by calculating the sums of partial event probabilities that are stored in array; and shadow mapping and/or convolution shadow mapping, in which shadows are added to scenes in three dimensional computer graphics. In this case, the input array contains occlusion or depth information of a 3D scene view in each element.

Unfortunately, summed area tables suffer from two significant disadvantages. One disadvantage is that summed area tables are effectively performing a prefix-sum scan operation on each and every element of the input array, which, when the summed area table is generated for lengthy arrays and/or in multiple dimensions, can be computationally expensive to generate and store. The second and more significant disadvantage is that summed area tables suffer from issues with integer over-wrapping and numerical precision. With arrays and/or data values of substantial yet widely common sizes (such as those used for HD-video or SLR camera images), there is a risk of exceeding the floating point mantissa value resolution or exceeding the maximum integer value during the creation of the summed area table. This can easily cause imprecision and over-wrapping, respectively, in summed area computations where the maximum integer values or the floating point mantissa's resolution are subsequently breached due to the aforementioned limitations of the summed area table. This can lead to unintended distortions and potentially disastrous loss of data, particularly when these floating point and integer data type limitations are exceeded in many of the summed area table values.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments of the claimed subject matter are directed to methods and systems to perform area summation of data values by applying a binary reduction pattern to generate a ripmap of partial sums from an input array. According to embodiments, once generated (e.g., during a first stage), addresses in the ripmap are determined and the values at those addresses are calculated in a subsequent stage to determine the summation of values for a desired target subsection of the input using a substantially reduced number of data fetches from memory. This approach proves particularly efficient in the case of multiple summation requests with overlapping target subsections. Embodiments may be extended to include two- or more dimensional input arrays. According to such embodiments, the ripmap generation stage itself may be performed in series of sub-stages corresponding to the number of dimensions in the input array. For example, in order to generate a two (x, y) dimensional ripmap, one dimension is traversed, e.g., in the x-direction in a first sub-stage, then in y-direction in a subsequent sub-stage. Within each sub-stage of the series, a reduction operator is used that locally adds two elements along the respective direction. This is repeated until the output is only one element wide in the respective direction. Each sub-stage uses the complete output of the previous stage plus the original input data as input, e.g., the y-direction sub-stage in a two dimensional embodiment will use the original input and the x-direction's complete output as its own input. For embodiments operating on a greater number of dimensions, this process may be repeated using each previous sub-stage's output for the number of sub-stages (dimensions) beyond the first. The claimed embodiments not only provide an efficient and effective technique to computing area summation, but avoid the disadvantages of over-wrap and imprecision suffered by traditional summed area table techniques.

According to embodiments, data arrangements called ripmaps are utilized. These embodiments extend the technique of mip-mapping with non-square reductions of the data input. Such input may include averages of color values, serving the acceleration of anisotropic texture filtering. According to aspects of the present invention, ripmaps are used to hold pre-computed sums of input elements. For two-dimensional input in the x and y-direction, for example, a 4×4 input can be reduced to the arrangements 4×2, 4×1, 2×4, 1×4, then 2×2, 2×1, 1×2, and finally, 1×1 in a ripmap. In other words, a ripmap is a reduction-based data structure, containing all power-of-two reductions that can be generated across all of the input dimensions. Ripmaps can be quickly computed in data-parallel fashion, requiring 4 n data reads and 3 n data writes in total. Non-square and/or non-power-of-two input may be padded accordingly to the next power-of-two square dimensions.

The ripmaps may be used—according to various aspects of the subject invention—to replace Summed Area Tables (SATs) for the purpose of computing a large number of area sum computations spanning portions of an input data. According to a first embodiment, a ripmap of partial sums is generated from the input data; a first advantage is that the procedure uses less memory bandwidth than generating a conventional summed area table (SAT). When provided with one or more target subsections over which area sums shall be computed, a novel gathering method utilizes the generated ripmap to gather pre-computed partial sum results from the ripmap, using at maximum $\log_2(\text{width}) * \log_2(\text{height})$ lookups to generate one summed area result for a given target subsection. While computing several summed area results from overlapping target subsections in the input array, the gathering algorithm may temporarily store partial sums in a L1 cache of a processor (such as a CPU or GPU) to improve performance.

According to some embodiments, the summed areas for multiple target subsections may be calculated simultaneously. Each target subsection may be computed in its own processing thread executed by the processor. In such implementations, efficiency of the computation is further increased since each ripmap fetch is stored in a cache (e.g., the L1 cache), accessible to each of the multiple threads and thereby reducing the overall number of data fetches required. The substantially faster generation of ripmaps (in contrast to SAT) also provides an efficient and effective solution for image processing that operates on quickly changing input, such as video footage or video game content. Despite this optimization, multiple summed area computations are still computationally independent of each other while gathering partial sums from the ripmap, and thus maintain data parallelism in processing summed area computations. This way, computational redundancies in overlapping input regions can even be utilized on a data-parallel processor such as the GPU (through L1 temporal and thread-spatial coherency that bundles similar accesses to the ripmap while several threads are busy computing the area sum of several overlapping target subsections in parallel).

BRIEF DESCRIPTION OF THE DRAWINGS

The accompanying drawings, which are incorporated in and form a part of this specification, illustrate embodiments of the invention and, together with the description, serve to explain features of the disclosure:

FIG. 4 is an illustration of the coverage view of an exemplary ripmap of partial sums for a one-dimensional input array, in accordance with various embodiments of the claimed subject matter.

FIG. 8 is an illustration of an exemplary two dimensional input array, in accordance with various embodiments of the claimed subject matter.

FIG. 10 is an illustration of an exemplary two dimensional input array with a ripmap of partial sums generated in a second direction, concatenated with output from a first direction, in accordance with various embodiments of the claimed subject matter.

FIG. 11 is an illustration of an exemplary two dimensional input array with a ripmap of partial sums generated with concatenated output in two directions, in accordance with various embodiments of the claimed subject matter.

FIG. 12 is an illustration of exemplary two dimensional input array with an application of a binary reduction pattern to derive a plurality of partial sums corresponding to power-of-two sized rectangular target subsections, in accordance with various embodiments of the claimed subject matter.

FIG. 13 is an illustration of exemplary two dimensional input array with a target subsection and the corresponding gathering addresses in a corresponding ripmap, in accordance with various embodiments of the claimed subject matter.

DETAILED DESCRIPTION

Figure 1:
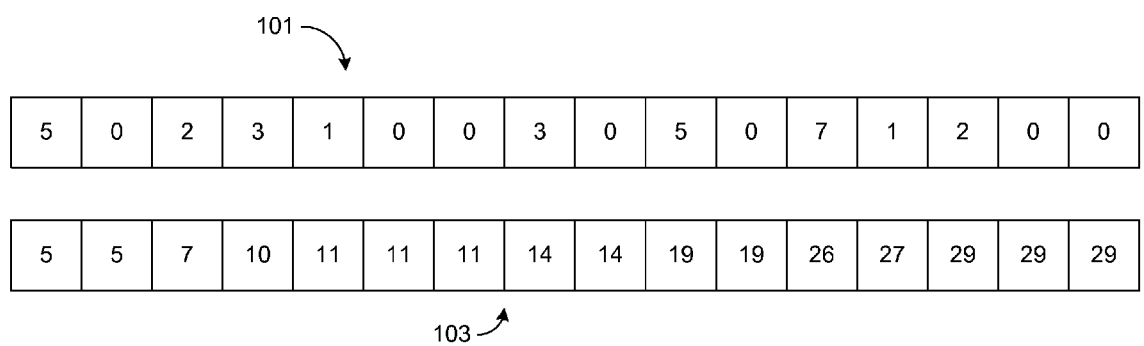
FIG. 1 is a block diagram of a one dimensional input array and a conventional ripmap of partial sums of the input array.

Reference will now be made in detail to embodiments of the claimed subject matter for performing area summation of data values by applying a binary reduction pattern to generate a ripmap of partial sums from an input array, examples of which are illustrated in the accompanying drawings. While the claimed subject matter will be described in conjunction with the disclosed embodiments, it will be understood that they are not intended to be limited to these embodiments. On the contrary, the claimed subject matter is intended to cover alternatives, modifications and equivalents, which may be included within the spirit and scope as defined by the appended claims.

Furthermore, in the following detailed descriptions of embodiments of the claimed subject matter, numerous specific details are set forth in order to provide a thorough understanding of the claimed subject matter. However, it will be recognized by one of ordinary skill in the art that the claimed subject matter may be practiced without these specific details. In other instances, well known methods, procedures, components, and circuits have not been described in detail as not to unnecessarily obscure aspects of the claimed subject matter.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer generated step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present claimed subject matter, discussions utilizing terms such as "gathering", "adding", "fetching," "storing," "creating," "protecting," "receiving," "destroying," or the like, refer to the action and processes of a computer system or integrated circuit, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Summed Area Computation

Figure 2:
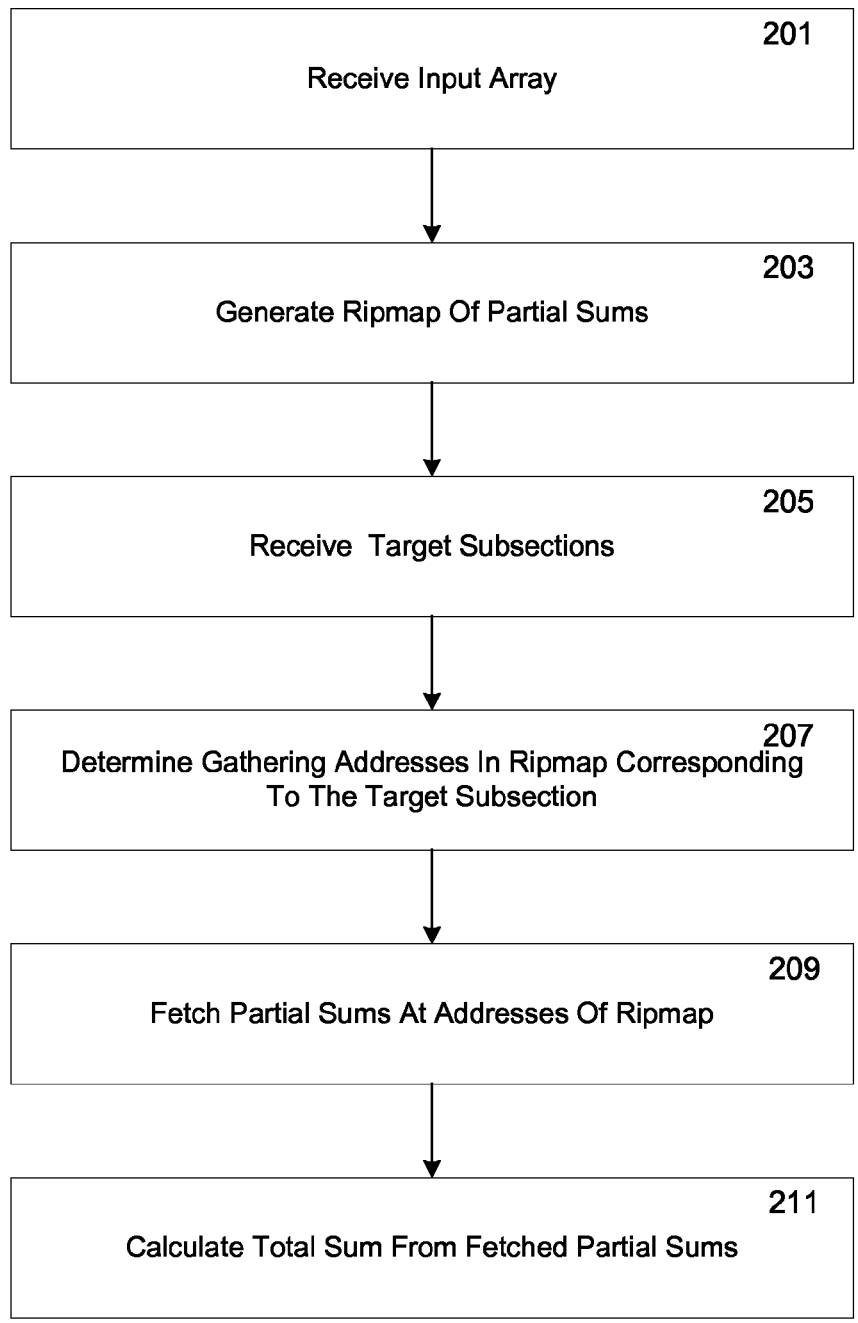
FIG. 2 is a flowchart of a process for computing one area sum for a target subsection of an input array using a ripmap of partial sums generated in accordance with conventional practice. Note that the actual implementation may run a large number of these processes in parallel, accessing the same ripmap, computing one area sum for one target subsection each.

FIG. 2 depicts a flowchart of a computer-controlled process 200 for computing a summed area from an input array using a ripmap of partial sums, in accordance with conventional practice. Steps 201-211 describe the steps comprising the process 200 depicted in the flowchart of FIG. 2. In one embodiment, the process 200 may be performed, in whole or in part, by a processor in a computing device or image processing system.

At step 201, an input array is received. The input array may comprise a plurality of elements, each element containing a value—such as an integer or floating point, for example. According to an embodiment, the input array may comprise a one-dimensional array of input. According to further embodiments, the input array may be implemented as a multi-dimensional array of input. In still further embodiments, the elements of the input array may correspond to individual pixels in an image. For example, each position (e.g., an index or address) of a two-dimensional input array may correspond to the color values of a pixel in an image arranged as a coordinate plane. These color values may, for example, correspond to values in an RGB color space or to a vector in a YUV color space. For vector-type input elements such as for RGB implementations, a corresponding vector-type ripmap would be generated by applying the described procedures to each vector (color) component individually.

At step 203, a ripmap of partial sums is generated for the input array received at step 201. According to various embodiments, the ripmap of partial sums may be generated by applying a binary reduction pattern to the values of the input array, and may be implemented to comprise elements arranged in a plurality of levels (e.g., a height or address space), wherein each level has a width (e.g., as many elements) equal to the $\log_2$ of the level below it. Each element in the ripmap stores the sum of a pair of corresponding elements in the level below it. The first level of the ripmap contains the input array's value (in some embodiments, one or more zero values may be added to length the array in order to maintain a power-of-two array size). The second level of the ripmap stores the sums of the pairs of elements in the input array, and the third level of the ripmap stores the sums of pairs of elements from the second level of the ripmap (and so on, for each successive level). Generation of the ripmap is described in greater detail below.

At step 205, a target subsection of the input array is received. The target subsection may comprise, for example, a region of interest in an image or the support region of a filter kernel surrounding a given pixel. According to some embodiments, the target subsection may describe a consecutive string of elements in the input array for one-dimensional input arrays, or a rectangular subset of elements in a two-dimensional input array. Such embodiments may be applied to applications for depth-of-field effect creation, wherein each target subsection may correspond to a group or "window" of pixels determined to have the same or a similar depth. Receiving the target subsection may comprise receiving the start and end addresses of elements in a one-dimensional input array, or the coordinates of start and end addresses in each dimensions of a multi-dimensional input array. Note that the algorithm is well suited to computing the areas area sums for multiple target subsections, and in fact becomes more efficient when several processing threads, each one responsible for one target subsection each, gather simultaneously from the ripmap to generate their respective area sum results. The increased efficiency is due to the ability to cache gathered partial sum values and thereby eliminating the need for each thread to gather the same partial sum values from main memory. As a result, the computation of area sums for target subsections sharing one or more partial sums may have a substantially reduced number of data fetches from main memory overall.

At step 207, an efficient selection of the addresses in the ripmap generated at step 203 that correspond to the target subsection is determined by processing the binary representation of the (potentially multi-dimensional) start and end coordinates of the target subsection in the input array. The data values at the selected addresses in the ripmap are gathered from the ripmap (described below with respect to FIG. 6) and in this way, the relevant, pre-computed partial sums of the input array values are referenced.

In embodiments with multi-dimensional input arrays, the determination of ripmap gathering addresses is performed by analyzing the bit patterns of start and end coordinates in each dimension separately. For each dimension analyzed, an extra address component is added to the final gathering address. The bit pattern analysis thus yields a set of gathering widths and positions in the respective dimension of the input array, which correspondingly sets forth a portion of the final ripmap gathering addresses. With subsequent, recursive analysis of the bit patterns of each dimension's start and end coordinates, the final ripmap gathering addresses can be determined, and can then be used to again gather partial sums, and finally added together for the final result for a given target subsection. According to various embodiments, the number of addresses in the ripmap determined at step 207 is never more than the product of the log base 2 of all dimensions' sizes of the (possibly padded) input array.

At step 209, the partial sums at the selected addresses in the ripmap determined at step 207 are fetched. Each of the partial sums may be fetched and stored in a cache of a processor performing the process 200, for example. In further embodiments, the cache may comprise an L1 cache of a central processing unit (CPU) or of a computing device or image processing system. At step 211, the total sum of the partial sums fetched at step 209 is calculated. The total sum thus represents the integral value of all elements in the target subsection of the input array received in step 201. In further embodiments, an average value may be calculated from the area sum by dividing the area sum by the number of elements in the target subsection. The average value may represent, for example, an average color intensity value for the target subsection. The process 200 may thus be used to perform anisotropic data filtering to an image along the region of pixels corresponding to the target subsection of the input array, or to apply spatially varying filters to each region of pixels in an image.

In still further embodiments, the process 200 may be used to accelerate occlusion computations in shadow map algorithms, or to deliver probability outcomes for a given target subsection when provided with local probability spans in the input area. For example, for occlusion computations in 3D graphics, the input data may correspond to depth values for each pixel in the image as seen from a light source, where each depth value describes the distance between an object and a computed light source. This "light source view depth image" may be used to determine if other objects are occluded. An area sum of the depth values or an area sum of the binary comparison results between the depth values of candidate objects and the depth values, using the methods described herein, will permit an embodiment to quickly determine partial shadowing of objects in 3D graphics.

Ripmap Generation

Figure 3:
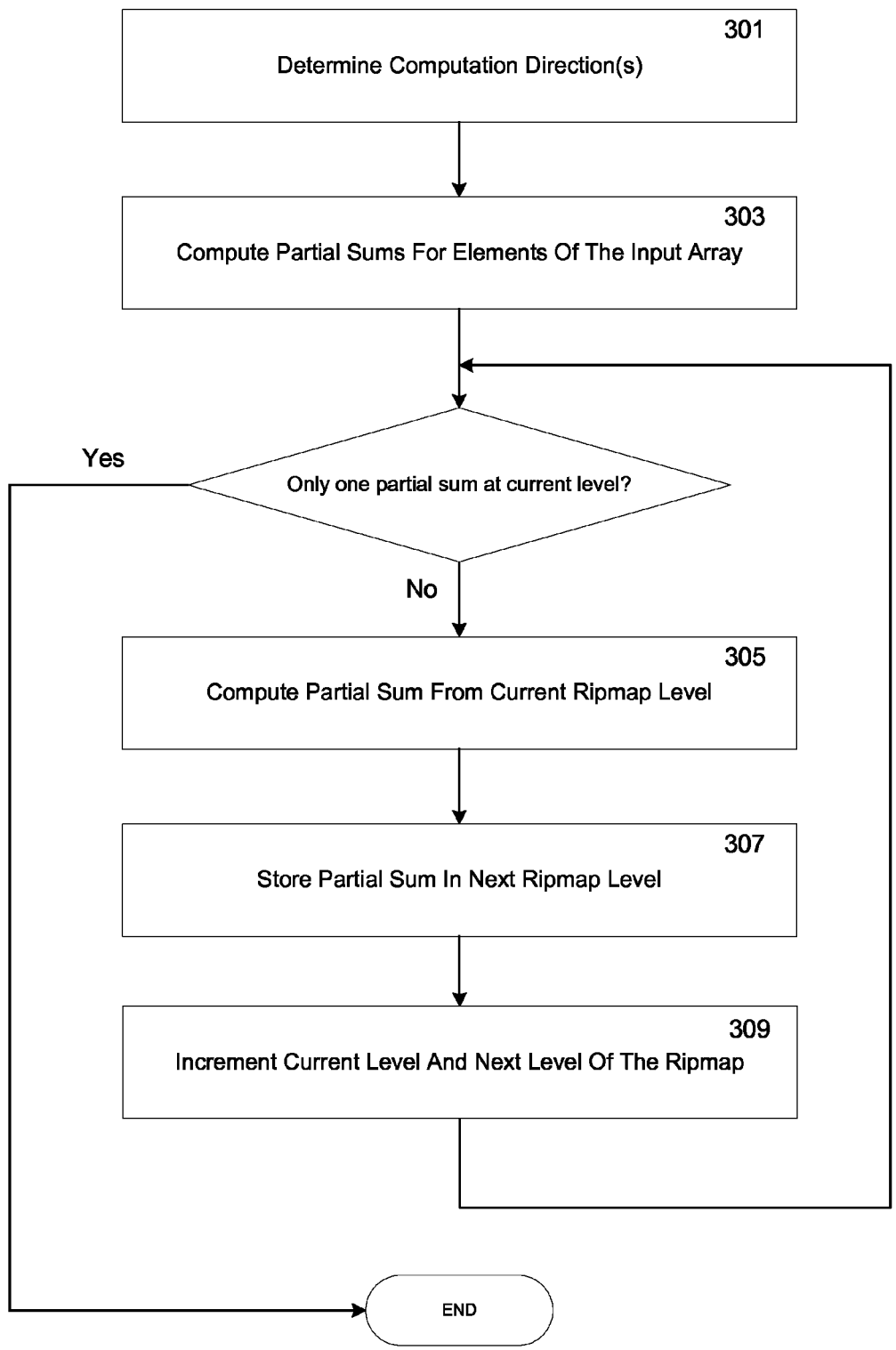
FIG. 3 is a flowchart of a process for generating a ripmap of partial sums, in accordance with various embodiments of the claimed subject matter.

FIG. 3 is a flowchart of a computer-controlled process 300 for generating a ripmap of partial sums, in accordance with various embodiments of the claimed subject matter. Steps 301-309 describe the steps comprising the process 300 depicted in the flowchart of FIG. 3. In one embodiment, the process 300 may be performed, in whole or in part, by a processor in a computing device or image processing system.

At step 301, the computation direction is determined. For one dimensional ripmaps, the computation direction is the ascendant direction of the dimension, for example. In two or more dimensional ripmaps, steps 301-309 may be performed for each dimension, in sequence, using the output of the previous stage. A first direction may be arbitrarily selected, or, alternatively, pre-programmed for a ripmap with any particular number of dimensions. At step 303, a partial sum is computed for every two elements of the input array and stored as units comprising the "current" level of a ripmap. If the number of partial sums as seen along the computational direction in the current level is ever only one, the process 300 ends. However, if more than one partial sum is stored in the current level, the process proceeds to step 305.

At step 305, the partial sum is derived for every two elements (e.g., partial sums from the previous level) in the current level of the ripmap. The partial sums derived in step 305 are stored in the next level of the ripmap at step 307, and the current level and next level are incremented at step 309. Steps 305-309 are repeated until the number of partial sums in the current level is ever equal to only 1.

According to an embodiment, generation of the ripmap may be performed in as many stages as there are input dimensions; e.g., for a two-dimensional input array, the ripmap generation may be performed over two stages, typically in the x-direction first, then in the y-direction. Within each stage, a reduction operator (e.g., steps 305-309) is used that adds two elements along the respective direction. This is repeated until the output is only one element wide in the respective direction. Each stage uses the complete output of the previous stage plus the original input data as input, e.g., the y-direction stage will use the original input and the x-direction's complete output as its own input.

According to various embodiments, the ripmap may be arranged in an address space such that each level has an address (or prefix address) and each element of each level has an address. In further embodiments, the ripmap may be stored in a memory of a computing device, e.g. the local memory of a graphics processing unit (GPU), or the main memory of the computing device. In further embodiments, the memory may comprise a cache, which can be shared amongst a plurality of processing threads, thereby reducing the number of main memory accesses required to generate a ripmap from an input array and the number of main memory accesses required for computing the area sums of multiple area target subsections simultaneously.

Exemplary Ripmap

FIG. 4 is an illustration of the coverage view of an exemplary ripmap 400 of partial sums for a one-dimensional array, in accordance with various embodiments of the claimed subject matter. As depicted in FIG. 4, the first level of the ripmap may comprise the original input array (possibly padded with additional elements having zero value where necessary to maintain a power-of-two array size). Each successive level of the ripmap comprises partial sums of a pair of elements in the previous level. A non-coverage view of the ripmap 400 may be depicted as a one-dimensional array with a single level, wherein each of the elements in "higher" levels may be appended to the end of the ripmap values in series.

Figure 5:
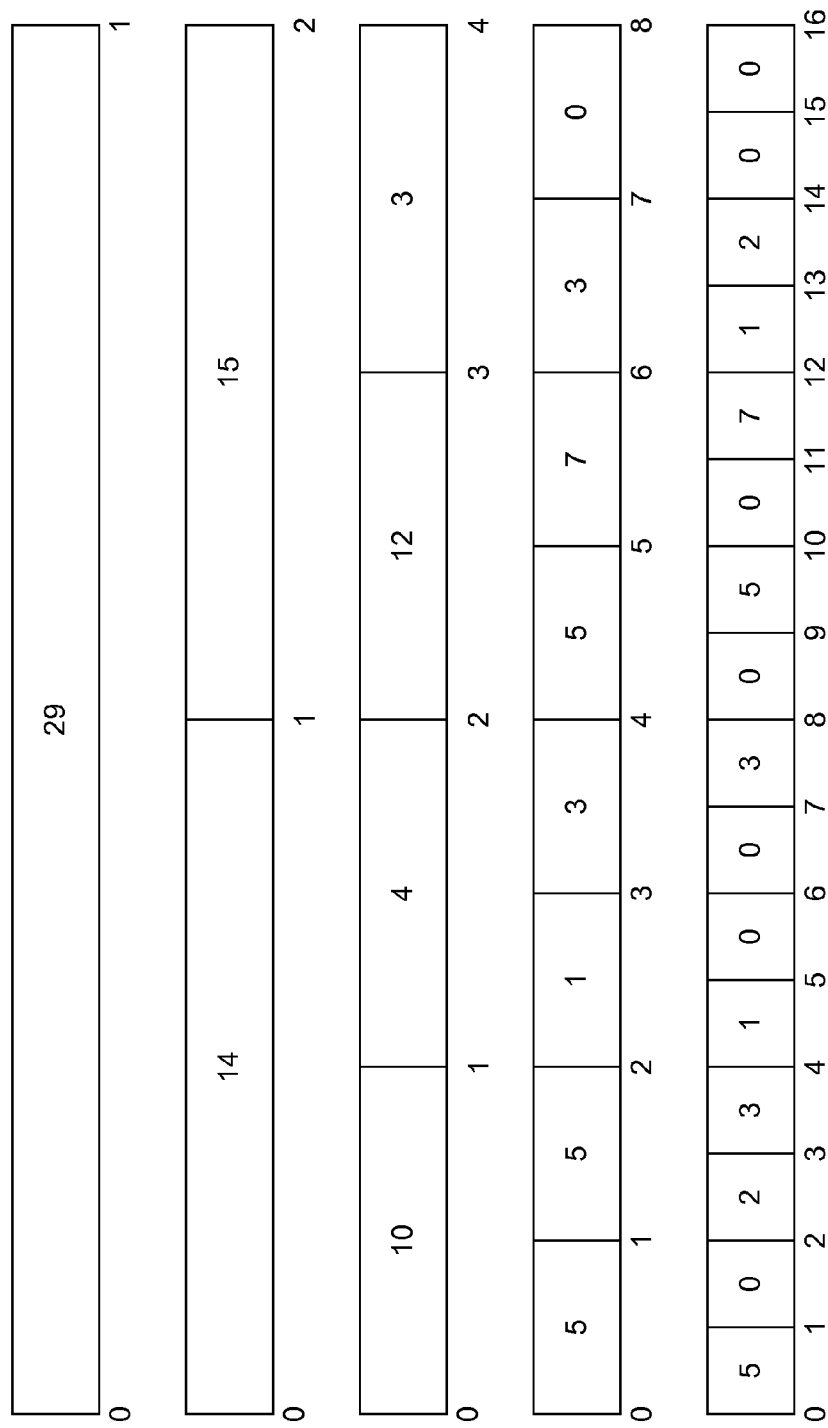
FIG. 5 is an illustration of the address space of an exemplary ripmap of partial sums, in accordance with various embodiments of the claimed subject matter.

FIG. 5 is an illustration of the address space of an exemplary ripmap 500 of partial sums, in accordance with various embodiments of the claimed subject matter. As depicted in FIG. 5, each level of the ripmap 500 is individually addressed with consecutive indices, and addressing restarts at each level.

Value Gathering

Figure 6:
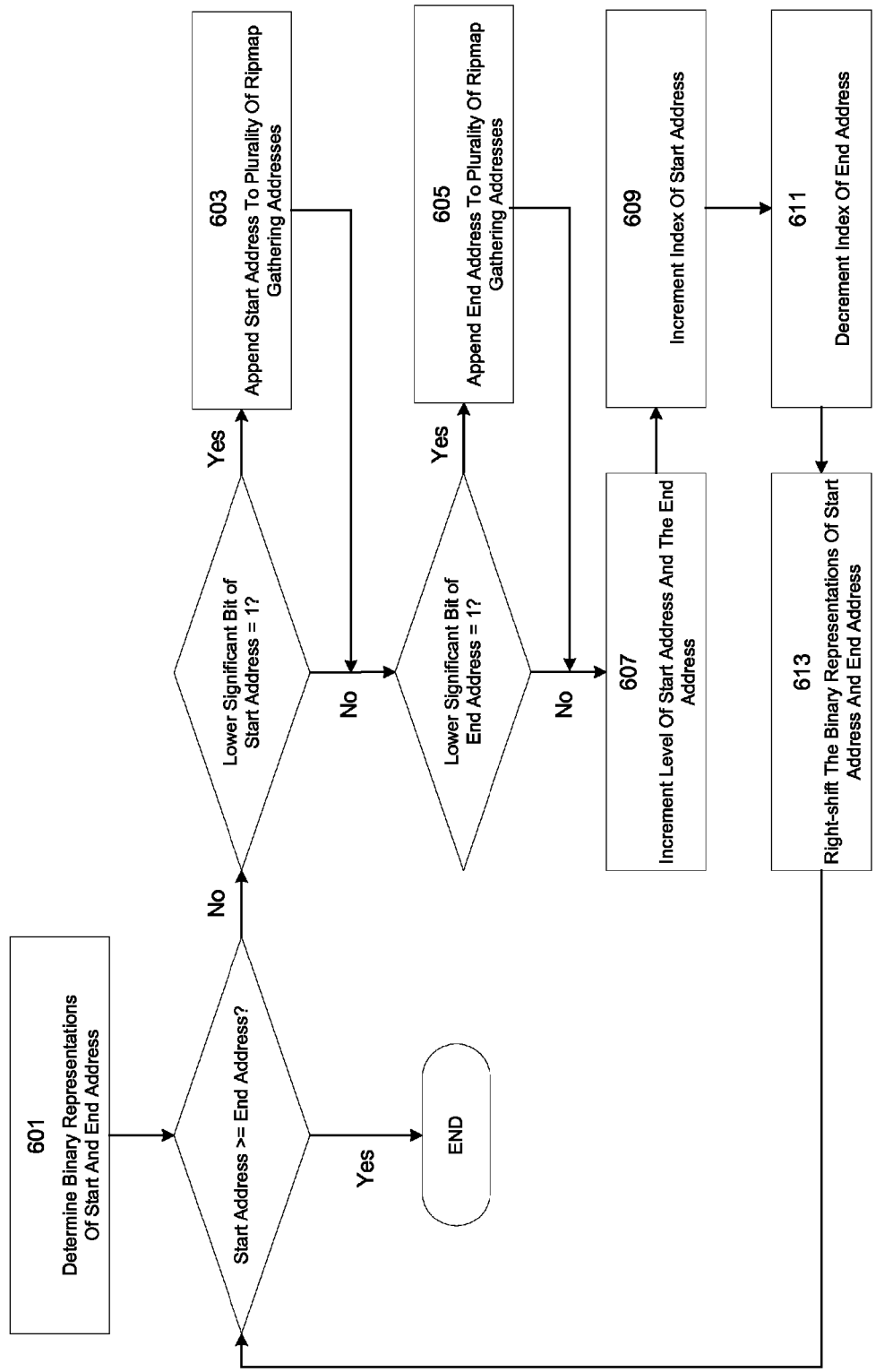
FIG. 6 is a flowchart for gathering values from a ripmap of partial sums, in accordance with various embodiments of the claimed subject matter.

FIG. 6 is a flowchart of a process 600 for gathering values from a ripmap of partial sums according to a bit pattern analysis of the coordinates of a target subsection, in accordance with various embodiments of the claimed subject matter. Steps 601-613 describe the steps comprising the process 600 depicted in the flowchart of FIG. 6. In one embodiment, the process 600 may be performed, in whole or in part, by a processor in a computing device or image processing system. According to various embodiments, The ripmap comprises a plurality of partial sums of the input values. These partial sums are computed (and are available for reference) when the subsection of the input values in question are aligned with a certain offset, or address. For example, a partial sum that starts at section 4 and covers 4 elements. A requested target subsection at the same location and size may thus be represented in the ripmap (and subsequently gathered from the ripmap) as a single value. This ripmap value, containing the sum of four elements in the input array, is also called a "4-wide partial sum," and, in some embodiments, is available if the start address of the requested area is a multiple of 4. In contrast, if the requested section in the input array starts at offset 2, then gathering a single 4-wide partial sum would not be available, and a pair of 2-wide partial sums must be gathered instead. This alignment concept extends to multi-dimensional implementations. Thus, if the subsection coordinates within each dimension are aligned with powers of 2, a target subsection of 4×1 size may be gathered as a single partial sum at addresses (0,0), (0,4), and (4,4) in a two dimensional implementation. But a similar 4×1 request at 2, 2, will require gathering four 2×2 wide partial sums.

Process 600 begins at ripmap level 1 (e.g., the first level of a ripmap, holding the input array values). It is provided with the coordinates of a target subsection, and its task is to compute its area sum. In the first step 601, the binary representations of the start and end address for a target subsection of an input array are derived. Thus, a target subsection (e.g., a box filter request) between the addresses of 3 and 15 may be represented in binary as the indices 0011 and 1111, respectively. The start index and end index are subsequently compared. If the start index is less than the end index, the process proceeds to step 603. Otherwise, the process 600 terminates and all selected addresses (if any) may be used directly for ripmap value gathering and/or stored for later use (see above with respect to FIG. 2).

At step 603, if the least significant bit (LSB) of the binary representation of the start index is a 1, then the address (e.g., the index and level of the ripmap) of the element beginning after the start index in the current level is selected for fetching. In other words, if the start index in the current level is an odd number, the address corresponding to the current start index is selected. According to an embodiment, the selected addresses may be stored in (e.g., appended to) an array of address values. Alternatively, once an address has been selected, the data value of the element at the address in the ripmap may be fetched immediately and the value itself may be stored (e.g., in a register or the cache of a processor, for example). If the LSB of the binary representation of the start index is a 0 however, the process proceeds to step 605.

At step 605, if the LSB of the binary representation of the end index is a 1, then the address of the element preceding the end index in the current level is selected for fetching. Thus, as in step 603, if the end index in the current level is an odd number, the corresponding address (or its value) may be selected and/or stored. If the LSB of the binary representation of the end index is a 0 however, the process proceeds to step 607.

At step 607, the current level in the bit pattern analysis is incremented. The start index is also incremented (at step 609), while the end index is decremented (at step 611). The resulting start and end indices are right-shifted to remove the least significant bit (which has become irrelevant for these purposes). Thus, for example, a starting index of 8, represented as 1000, would first be incremented to 9 from step 609, represented as 1001, before right-shifting to 0100, or 4 at step 613. An end index of 13, represented as 1101, would be decremented to 12 (1100) at step 611, before being right-shifted to 0110, or 6. These adjusted start and end indices are used as the start and end indices in the next, higher ripmap level.

Once step 613 is performed, the adjusted start and end indices are compared, and, for so long as each new start index is not greater than or equal to the corresponding end index, steps 603-613 are repeated recursively. Each time the start or end index have a least significant bit that is equal to 1, the array of addresses (or corresponding data values) are populated with the element beginning at the start index in the current level or the element ending at the end index in the current ripmap level, respectively.

Figure 7:
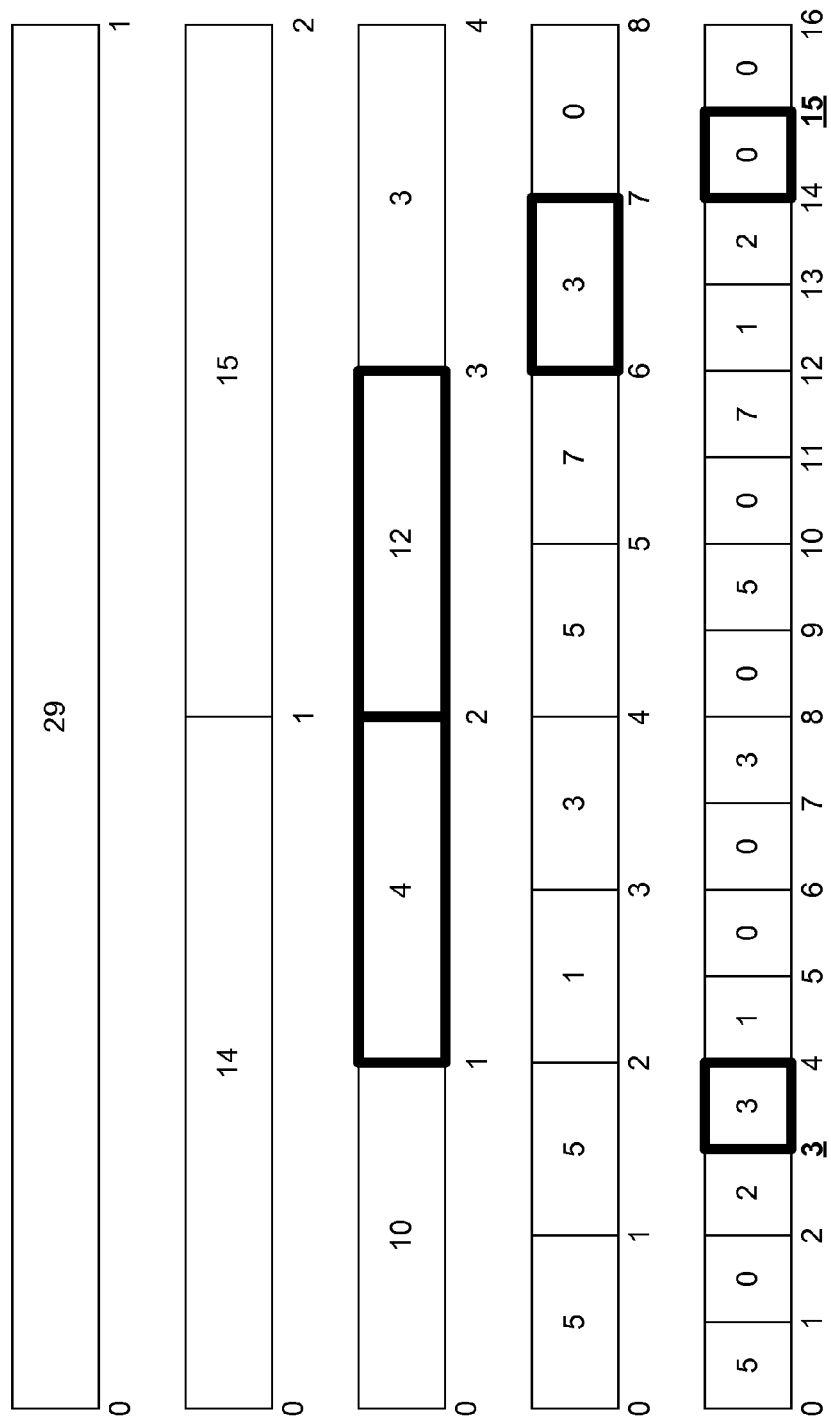
FIG. 7 is an illustration of an exemplary ripmap of partial sums with the application of a gathering pattern to identify a plurality of the partial sums for the purpose of computing an area sum efficiently, considering several overlapping target subsections, in accordance with various embodiments of the claimed subject matter.

FIG. 7 is an illustration of an exemplary ripmap of partial sums (700) used in conjunction with a bit pattern analysis to identify a plurality of the partial sums for the purpose of computing an area sum efficiently, in accordance with various embodiments of the claimed subject matter. For exemplary purposes, computation for an area sum of the values between addresses 3 and 15 is depicted. As shown in FIG. 7, the lower bound of the target subsection is used as the start index for input/ripmap fetches. In this example, the start index is set to 3.

With the help of the bit pattern analysis of target subsection start and end indices, the partial sums of the ripmaps that cover the largest (widest) sum of result-relevant input values are fetched. But this is also affected by alignment of the target subsection's start and end indices. To generate the overall area sum of an input array of 16 elements (as depicted in FIG. 7), the most efficient fetch would gather a 16-wide sum (e.g., the highest level of the ripmap 700), which contains the sum of all elements between the indices 0 and 16. The next most efficient fetch of partial sums would consist of two or more fetches of 8-wide sums, between the indices 0 and 8, and 8 and 16, and so on. However, as depicted in the instant example, the starting index of 3 is not aligned for a multi-element-wide sum fetch. As such, in a first iteration, the address of the single element to the right of the start index (3) is selected, and fetched (e.g., the value is gathered from the ripmap at the address of the current level). Once fetched, the start index is incremented to 4, effectively aligning the start index for 4-wide sums. In the next iteration of the bit pattern analysis, the LSB of the start index will be 0, and thus no element will be fetched. However, after the ripmap level increase and further right shifting of the start index, a value will be gathered from the ripmap, now corresponding to the announced 4-wide partial sum.

Simultaneously, as the end index with the value 15 is also an odd number, the end index is also not aligned for fetches of multi-element wide sums, which leads to fetching a single element from the first level of the ripmap (holding the input array values) instead. The end index is subsequently decremented, from 15 to 14, also right-shifted (bringing the end index to 7) and the level increased, which addresses the next ripmap level (level 2). Since the least significant bit of end index is now equal to 1, the address corresponding to the index has become relevant to the result and the value, corresponding to the sum of the elements in indices 13-14 of the input array, may be immediately fetched and added to the sum, or its address stored for later use. The next iteration through the bit pattern analysis of the end index results in an end index of 3. At ripmap level 3,4 wide sums are stored (see also FIG. 700), and even this partial sum is deemed relevant for the result. The following iteration of the bit pattern analysis causes however the start index to equal the end index, and the pattern therefore terminates. As depicted in FIG. 7, the width of the fetches increased monotonically by a factor of 2. The selected partial sums (e.g., the outlined elements in ripmap 700) may be fetched and subsequently summed to generate a total sum of the elements in the target subsection, or its addresses stored for later use (e.g. for the multi-dimensional input case).

According to various embodiments, the fetch width may be predicted by looking for set bits to decrease. This is an alternative view of the above procedure, where the right-shift in every iteration is omitted, showing more clearly how the width of the partial sums increase. In the instant example, the end index 15 corresponds to 1111 in binary. Since the value at bit position 0 is 1, a 1-wide sum (effectively an input value) is fetched at this first ripmap level. Decrementing the end position would arrive at an end index at the lowest level of the ripmap of 14 (1110). Since the value at bit position 1 of 1110 is 1, a 2-wide sum can be fetched, subsequently arriving at an end index of 12 (1100) at the lowest level of the ripmap. Since the value at bit position 2 of 1100 is also 1, a 4-wide sum can be fetched, decreasing the end index at the lowest level of the ripmap to 8 (1000). At 8, the start and end indices are equal, and the whole range has thus been converted into a sequence of optimal one-dimensional ripmap fetches. In still further embodiments, by right shifting the binary values of the start and end indices in the input array these bit-shifted indices can be used to address the upper levels of the ripmap directly. For example, right-shifting the end index of 15 at the bottom level would provide the end index (7) at the next level.

For multi-dimensional input, the principle is very similar as the one for single-dimensioned input, but the approach becomes recursive: whenever a fetch position and width in a first (primary) dimension has been determined, the bit pattern analysis is started for the other dimensions in series. Note that according to embodiments, the particular order of dimensions is arbitrary: Thus for example, with a two-dimensional input, the x-dimension could be subordinated to the y-dimension, i.e., every time that a fetch width for the y-dimension has been determined, the bit pattern analysis is applied in the x-dimension to complete the address components for a plurality of ripmap addresses to gather partial sums from. Once such a plurality has been determined, the actual values are gathered from the ripmap, and added to the forthcoming result. According to further embodiments, the bit pattern analysis is not limited to rectangular fetches only, and may have been adapted to extract partial sums from a ripmap for overlapping non-rectangle sized target subsections (such as trapezoids). According to such embodiments, the bit pattern analysis would in this case be used to collect one-dimensional stripe segments from the ripmap, corresponding to a loop along one dimension (e.g. y-dimension), while bit pattern analyzing varying start and end indices in the other dimension (e.g. x-dimension). This is still faster than individual input lookups that cover the trapezoid. Note that for such variants, one stage of ripmap reduction along this dimension (e.g. x-dimension) will suffice. This holds true even for higher dimensions (e.g., sheared box gathering from 3D input).

Two-Dimensional Input Arrays

FIG. 8 depicts an illustration of an exemplary two dimensional input array 800, in accordance with various embodiments of the claimed subject matter. As shown in FIG. 8, an 8 by 8 grid of elements containing integer values is depicted. According to various other embodiments, the two-dimensional input array 800 may correspond to pixel data for a corresponding 8×8 section of an image or coordinate plane. The pixel data may, for example, be the image data for anisotropic filtering and/or spatially varying filters.

Figure 9:
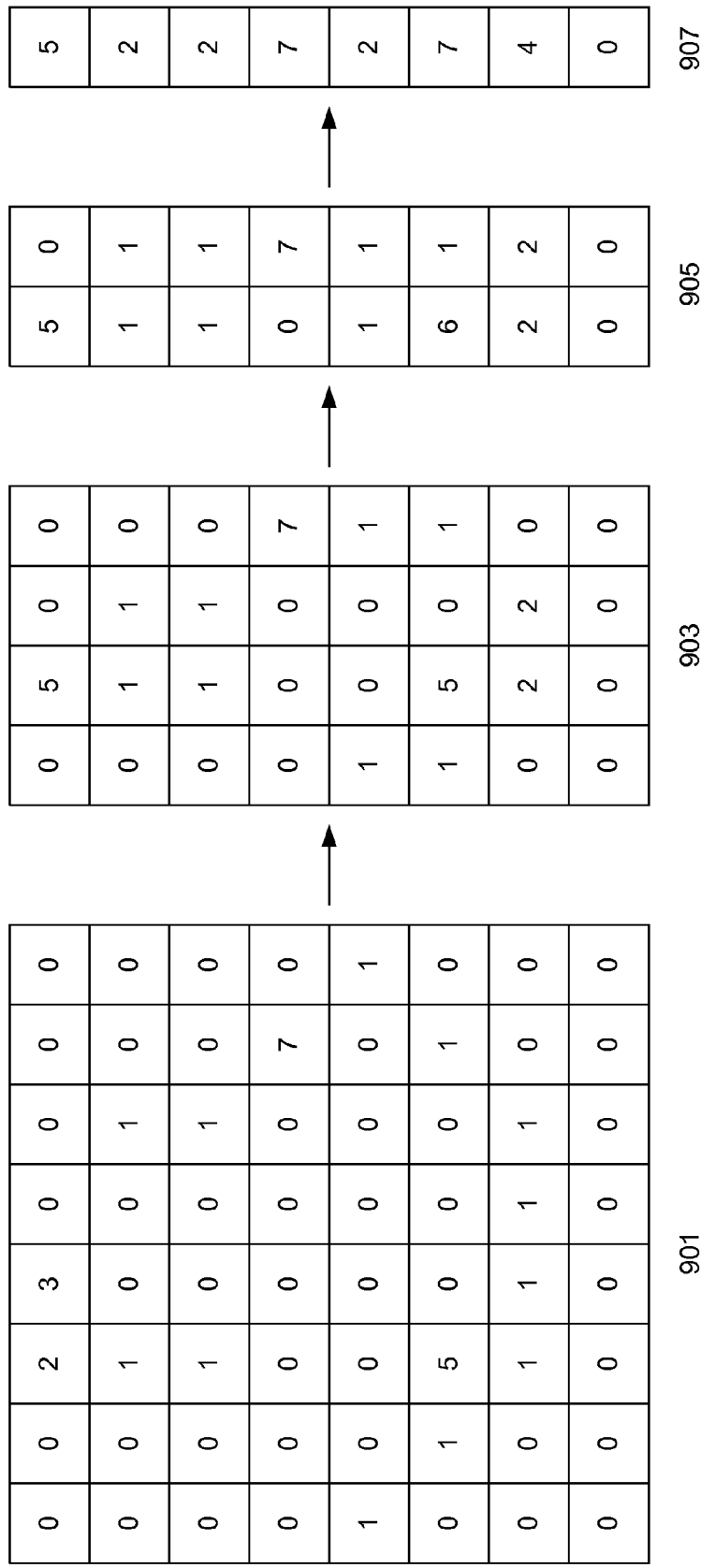
FIG. 9 is an illustration of an exemplary two dimensional input array with a ripmap of partial sums generated in a first direction, in accordance with various embodiments of the claimed subject matter.

FIG. 9 is an illustration of an exemplary two-dimensional input array with a ripmap 900 of partial sums generated in a first direction (x-direction), in accordance with various embodiments of the claimed subject matter. As shown in FIG. 9, the ripmap 900 includes a plurality of levels (901-907), beginning with the input array itself, progressively and recursively condensed along the x-direction to achieve a single column of partial sums, each corresponding to an 8-wide partial sum.

FIG. 10 is an illustration of an exemplary two dimensional input array with a ripmap 1000 of partial sums generated in a second direction, concatenated with output from a first direction, in accordance with various embodiments of the claimed subject matter. As shown in FIG. 10, the ripmap 1000 includes a plurality of levels (1001-1007), beginning with the input array itself, progressively and recursively condensed along the y-direction to achieve a single row of partial sums, each corresponding to an 8-wide sum.

FIG. 11 is an illustration of an exemplary two dimensional input array with a ripmap 1100 of partial sums generated with concatenated output in two directions, in accordance with various embodiments of the claimed subject matter. As shown in FIG. 11, the top left quadrant 1101 of the ripmap 1100 includes the input array, with the top right quadrant 1103 comprising the ripmap of the partial sums generated solely from reduction in the x-direction, the bottom left quadrant 1105 comprising the ripmap of the partial sums generated solely from reduction in the y-direction, and the bottom right quadrant 1107 comprising a ripmap of all partial sums that have been generated from a combined reduction in the x- and y-direction. The absolute sum of all values in the input array is contained in the bottom right element of the bottom right quadrant 1107, as an element having a 8×8 wide sum.

FIG. 12 is an illustration 1200 of an exemplary two-dimensional input array where a bit analysis pattern for a given target subsection has computed a plurality of rectangular partial sums, in accordance with various embodiments of the claimed subject matter. As depicted in FIG. 12, a 10×8 two-dimensional input array 1201 with a target subsection (outlined region) comprised between the index (2, 2) and the index (7, 6) is expressed here as four 2×2 rectangular subsections and two 1×2 rectangular subsections, following the alignment and power-of-two size rules for the coverage of partial sums provided in a 2D ripmap as described previously. The rectangular subsections for these six partial sums in the input array are depicted in 1203.

FIG. 13 is an illustration of an exemplary two dimensional input array 1300 with the same target subsection as in FIG. 12, displayed with the corresponding gathering addresses in the ripmap of partial sums in accordance with various embodiments of the claimed subject matter. As depicted in FIG. 13, the top left quadrant 1301 of the ripmap 1300 includes the input array, with the top right quadrant 1303 comprising the ripmap of the partial sums stemming from reduction solely in the x-direction, the bottom left quadrant 1305 comprising the ripmap of the partial sums generated from reduction solely in the y-direction, and the bottom right quadrant 1307 comprising a ripmap of partial sums generated from a combined reduction in the x- and y-direction.

As previously shown in FIG. 12, the original target subsection in the input array is subdivided into rectangular subsections that align with (correspond to) partial sums that the ripmap can provide. The locations of these partial sums, which were computed in above algorithm, are shown in FIG. 13. For example, the 2×2 wide partial sums are located in the bottom right quadrant 1307, as the result of a reduction in both the x- and y-dimension. The two 1×2-wide partial sums, which are the result of a reduction in only the y-dimension, are located instead in the bottom left quadrant 1305. According to various embodiments, application of the bit pattern analysis (as described above with respect to FIG. 6) to the ripmap 1300 would determine the addresses of the outlined elements in ripmap 1300. An area sum of the target subsection may thus be calculated by an ensuing fetch of the data values contained in the ripmap (e.g., 1, 1, 7, 5, 0, and 1) at the addresses determined in the above described procedures. As depicted, the area sum from a target subsection of 5×4 elements may thus be calculated from six fetches, instead of twenty fetches that a naïve approach would have to use without a ripmap of partial sums.

Example Computing Device

Figure 14:
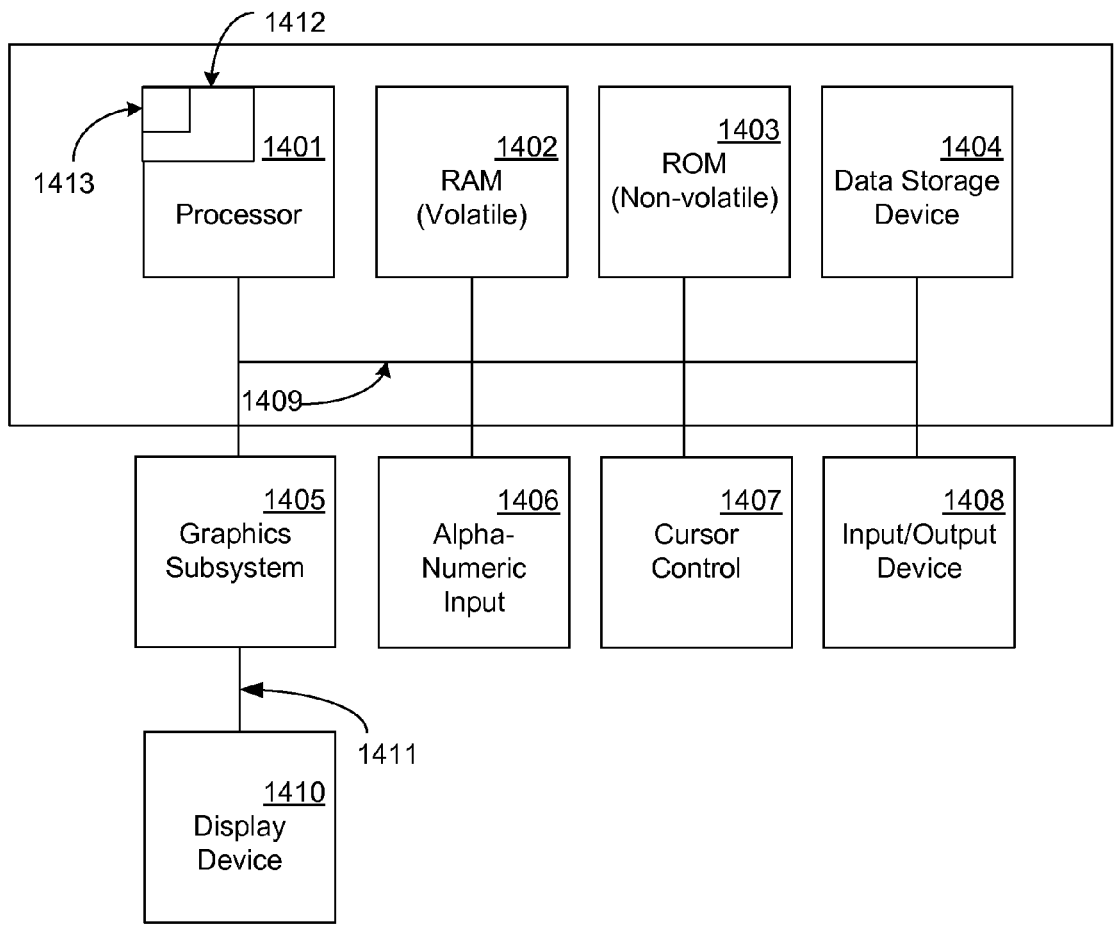
FIG. 14 is a block diagram of an exemplary computing system in accordance with various embodiments of the claimed subject matter

As presented in FIG. 14, a system upon which embodiments of the present invention may be implemented includes a general purpose computing system environment, such as computing system 1400. In its most basic configuration, computing system 1400 typically includes at least one processing unit 1401 and memory, and an address/data bus 1409 (or other interface) for communicating information. The processing unit 1401 may comprise a central processing unit (CPU) for example, and, according to various embodiments, may comprise one or more caches 1412. In still further embodiments, a cache of the one or more caches 1412 may be implemented as an L1 cache, and used to store data fetched from addresses of a ripmap and the input array. Depending on the exact configuration and type of computing system environment, memory may be volatile (such as RAM 1402), non-volatile (such as ROM 1403, flash memory, etc.) or some combination of the two.

Computer system 1400 may also comprise an optional graphics subsystem 1405 for presenting information to the computer user, e.g., by displaying information on an attached display device 1410, connected by a video cable 1411. According to embodiments of the present claimed invention, the display device may be physically mounted on the computing system 1400 and coupled to the graphics subsystem 1405. Alternatively, the graphics subsystem 1405 may be coupled directly to the display device 1410 through the video cable 1411, or indirectly via wireless means. Graphics subsystem 1405 may itself comprise memory (not shown), or may share a portion of the memory (e.g., volatile memory 1402). The graphics subsystem may contain a graphical processing unit (GPU) that can both create and perform the bit pattern analysis on the ripmap of partial sum and the input array, as described above.

Additionally, computing system 1400 may also have additional features/functionality. For example, computing system 1400 may also include additional storage (removable and/or non-removable) including, but not limited to, magnetic or optical disks or tape. Such additional storage is illustrated in FIG. 14 by data storage device 1407. Computer storage media includes volatile and nonvolatile, removable and non-removable media implemented in any method or technology for storage of information such as computer readable instructions, data structures, program modules or other data. RAM 1402, ROM 1403, and data storage device 1407 are all examples of computer storage media.

Computer system 1400 also comprises an optional alphanumeric input device 1406, an optional cursor control or directing device 1407, and one or more signal communication interfaces (input/output devices, e.g., a network interface card) 1409. Optional alphanumeric input device 1406 can communicate information and command selections to central processor 1401. Optional cursor control or directing device 1407 is coupled to bus 1409 for communicating user input information and command selections to central processor 1401. Signal communication interface (input/output device) 1409, also coupled to bus 1409, can be a serial port. Communication interface 1409 may also include wireless communication mechanisms. Using communication interface 1409, computer system 1400 can be communicatively coupled to other computer systems over a communication network such as, for example, the Internet or an intranet (e.g., a local area network), or can receive data (e.g., a digital television signal).

As described herein, embodiments of the claimed subject matter have been provided which allow the computation of area sums of target subsections of an input array of varying dimensions by performing a bit pattern analysis on the provided target subsection coordinates by using a ripmap of partial sums generated from the input array by applying a binary reduction pattern to the input array values. According to various embodiments, the application of the novel bit pattern analysis described here determines a plurality of partial sums that may be used to calculate the requested area sum with a substantially reduced number of data fetches over a traditional approach, in particular when computing a large number of area sum requests, for overlapping target subsections in the input array. By storing only partial sums, the risk of data loss due to imprecision and over-wrapping of excessively large floating point or integer values may be mitigated in contrast to using alternative approaches that use a summed area table (SAT) to accelerate area sum computations. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for calculating an area sum from a multi-dimensional input array, the method comprising:
  receiving an input array and a plurality of target subsections of the input array, the input array comprising a plurality of values in a plurality of dimensions;
  pre-generating a ripmap corresponding to the input array, wherein the ripmap comprises a plurality of partial sums of the plurality of values in the input array and wherein the ripmap is arranged in a plurality of levels in a plurality of dimensions corresponding to the plurality of dimensions of the input array;
  selecting a primary dimension from the plurality of dimensions of the ripmap;
  generating a plurality of address components based on the plurality of target subsections in the primary dimension of the ripmap;
  applying a recursive loop to complement the plurality of address components for a plurality of ripmap addresses from a plurality of coordinates of the plurality of target subsections for every dimension other than the primary dimension of the ripmap, and to obtain a plurality of addresses of partial sums in the ripmap;
  gathering a set of partial sums corresponding to the plurality of addresses of partial sums in the ripmap; and
  calculating a total sum corresponding to an area sum of the plurality of target subsections from the set of partial sums.

2. The method according to claim 1, wherein the multi-dimensional input array comprises a two-dimensional input array, and the ripmap comprises two dimensions.

3. The method according to claim 1, wherein the multi-dimensional input array comprises a 3-dimensional input array and the ripmap comprises three dimensions.

4. The method according to claim 1, wherein the plurality of target subsections comprises a start index and an end index for each dimension of each target subsection.

5. The method according to 4, wherein generating a plurality of address components comprises:
  a) determining a binary representation of the start index in the primary dimension and a binary representation of the end index in the primary dimension;
  b) appending the start index to the plurality of ripmap gather addresses if a least significant bit of the binary representation of the start index is of value 1;
  c) appending the end index minus 1 to the plurality of ripmap gather addresses if a least significant bit of the binary representation of the end index is of value 1;
  d) incrementing the level of the start address and the end address;
  e) incrementing the start index;
  g) decrementing the end index;
  h) right-shifting the binary representations of the start address and the end address; and i) recursively repeating steps a) through h) until incrementing the start index and decrementing the end index would cause the start index to be equal to or greater than the end index.

6. The method according to claim 5, wherein applying a recursive loop comprises recursively generating a plurality of address components for a plurality of ripmap gather addresses based on binary representations of the plurality of coordinates of the plurality of target subsections in the input array.

7. The method according to claim 1, further comprising calculating an average from the total area sum corresponding to the plurality of target subsections.

8. The method according to claim 7, further comprising:
calculating an offset from the average and a target element of the input array; and
applying the average offset to the target element.

9. The method according to claim 8, wherein the plurality of elements of the input array correspond to a plurality of pixel values, and the plurality of pixel values correspond to a plurality of pixels in an image.

10. The method according to claim 9, wherein the target element comprises a target pixel in the image, and the target subsection comprises a region of pixels surrounding the target pixel.

11. A method for calculating an area sum from an input array, the method comprising:
receiving an input array comprising a plurality of elements;
generating a ripmap of partial sums over a plurality of input values of the input array the ripmap being arranged in a plurality of levels;
determining a plurality of addresses in the ripmap of partial sums corresponding to an identified target subsection of said input array;
fetching a plurality of values corresponding to the plurality of addresses in the ripmap of partial sums; and
calculating a total sum corresponding to the target subsection from the ripmap of partial sums.

12. The method according to claim 11, wherein generating the ripmap of partial sums comprises:
deriving a partial sum for every two elements of the plurality of elements in the input array;
storing the partials sum derived from the input array in a current level of the ripmap;
while there is more than one partial sum in the current level of the ripmap,
deriving a partial sum for every two partial sums in the current level of the ripmap;
storing the partial sums from the current level of the ripmap in a next level of the ripmap; and
incrementing the current level and next level of the ripmap.

13. The method according to claim 11, further comprising receiving a target subsection of the input array wherein the receiving comprises determining a start address and an end address in the ripmap from the target subsection of the input array.

14. The method according to claim 13, wherein the start address corresponds to a start index at a level in the ripmap, and the end address corresponds to an end index at the level in the ripmap.

15. The method according to claim 14, wherein the determining the plurality of addresses in the ripmap comprises:
a) determining a binary representation of the start index and a binary representation of the end index;
b) appending the start index to the plurality of partial sum addresses if a least significant bit of the binary representation of the start index is a 1;
c) appending the end index minus 1 to the plurality of partial sum addresses if a least significant bit of the binary representation of the end index is a 1;
d) incrementing the level of the ripmap that corresponds to the start index and end index;
e) incrementing the start index;
g) decrementing the end index;
h) right-shifting the binary representations of the start index and the end index; and
i) repeating steps a) through h) until incrementing the start index and decrementing the end index causes the start index to be equal to or greater than the end index.

16. The method according to claim 11, further comprising calculating a target subsection average from the computed area sum, using the number of elements in the target subsection.

17. The method according to claim 16, further comprising:
calculating an offset from the target subsection average and a target element of the plurality of elements; and
applying the offset to the target element.

18. The method according to claim 17, wherein the plurality of elements in the input array correspond to a plurality of pixel values.

19. The method according to claim 18, wherein the plurality of pixel values correspond to at least one of: color values, and depth values for the plurality of pixels.

20. The method according to claim 18, wherein the plurality of pixel values correspond to a plurality of pixels in an image.

21. The method according to claim 20, wherein the target element comprises a target pixel in the image, and the target subsection comprises a region of pixels surrounding the target pixel.

22. The method according to claim 21, further comprising applying anisotropic data filtering on the target subsection by computing a plurality of target subsection averages along a plurality of rectangular target subsections of pixels surrounding the target pixel.

23. The method according to claim 22, wherein the applying anisotropic data filtering to the target subsection comprises computing the plurality of target subsection averages for a plurality of regions of varying size surrounding the target element in the input array.

24. The method according to claim 11, wherein the fetching of partial sums corresponding to the plurality of addresses in the ripmap of partial sums comprises storing the obtained partial sums in a cache of a processor.

25. The method according to claim 24, wherein the cache comprises an L1 cache, the L1 cache being comprised in at least one of: a central processing unit (CPU) and a graphics processing unit (GPU).

26. The method according to claim 11, wherein the ripmap has a width and a height corresponding to a dimension of the input array, the width corresponding to the length of the input array and the height corresponding to the number of levels in the ripmap.

27. The method according to claim 26, wherein a first level of the ripmap has a width that corresponds to the number of elements in the input array if the number of elements in the input array is a power of two.

28. The method according to claim 27, further comprising:
appending the first level of the ripmap with a plurality of padding elements if the number of elements in the input array is not a power of two such that the width of the first level of the ripmap is equal to the number of elements in the input array and a power of two, the plurality of padding elements having a value of 0.

29. The method according to claim 27, wherein the fetching partial sums has a maximum number of fetches corresponding to the product of the log base 2 of the width and the log base 2 of the height of the input array.

30. A non-transitory computer readable medium containing program instructions embodied therein for causing a computer system to calculate a ripmap of partial sums from a multi-dimensional input array, the program instructions comprising:
   instructions to receive an input array and a plurality of target subsections of the input array, the input array comprising a plurality of values in a plurality of dimensions;
   instructions to pre-generate a ripmap corresponding to the input array, wherein the ripmap comprises a plurality of partial sums of the plurality of values in the input array and wherein the ripmap is arranged in a plurality of levels in a plurality of dimensions corresponding to the plurality of dimensions of the input array;
   instructions to select a primary dimension from the plurality of dimensions of the ripmap;
   instructions to generate a plurality of address components based on the plurality of target subsections in a primary dimension of the ripmap;
   instructions to apply a recursive loop to complement the plurality of address components for a plurality of ripmap addresses from a plurality of coordinates of the plurality of target subsections for every dimension other than the primary dimension of the ripmap, and to obtain a plurality of addresses of partial sums in the ripmap;
   instructions to gather a set of partial sums corresponding to the plurality of addresses of partial sums in the ripmap; and
   instructions to calculate a total sum corresponding to an area sum of the plurality of target subsections from the set of partial sums.

31. A non-transitory computer readable medium containing program instructions embodied therein for causing a computer system to calculate a ripmap of partial sums from an input array comprising a plurality of dimensions, the program instructions comprising:
   instructions to receive an input array comprising a plurality of elements;
   instructions to generate a ripmap of partial sums over a plurality of input values of the input array, the ripmap being arranged in a plurality of levels and having a start index and an end index;
   instructions to determine a plurality of addresses in the ripmap of partial sums corresponding to an identified target subsection of said input array;
   instructions to fetch a plurality of values corresponding to the plurality of addresses in the ripmap of partial sums; and
   instructions to calculate a total sum corresponding to the target subsection from the ripmap of partial sums.

32. The non-transitory computer readable medium according to claim 31, wherein the instructions to generate the ripmap comprises:
   instructions to copy the elements of the input array into a first level of the ripmap of partial sums;
   instructions to compute a partial sum for every two partial sums in a current level of the ripmap while there is more than one partial sum on the current of the ripmap;
   instructions to store the computed partial sums from the current level of the ripmap into elements in the next level of the ripmap while there is more than one partial sum on the current of the ripmap; and
   instructions to increment the current level and next level of the ripmap while there is more than one partial sum on a level of the ripmap.

33. The non-transitory computer readable medium according to claim 32, further comprising instructions to pad the first level of the ripmap with a plurality of zero-value elements if the sizes of the plurality of dimensions of the input array are not the equal and power-of-two.

34. The non-transitory computer readable medium according to claim 32, wherein the instructions to generate a plurality of partial addresses based on a binary representation of the ripmap comprises:
   a) instructions to determine a binary representation of the start index and a binary representation of the end index;
   b) instructions to append the start address to the plurality of addresses if the least significant bit of the binary representation of t the start index is 1;
   c) instructions to append the end index minus 1 to the plurality of addresses if the least significant bit of the binary representation of the end index is of value 1;
   d) instructions to increment the ripmap level at which the start index and end index apply;
   e) instructions to increment the start index;
   g) instructions to decrement the end index;
   h) instructions to right-shift the binary representations of the start index and the end index; and
   i) instructions to recursively repeat steps a) through h) until incrementing the start index and decrementing the end index would cause the start index to be equal to or greater than the end index.

35. The non-transitory computer readable medium according to claim 31, wherein the instructions to determine the plurality of addresses in the ripmap comprises:
   instructions to receive a description of target subsection coordinates in the input array; and
   instructions to generate a plurality of ripmap gather addresses based on a binary representation of the target subsection coordinates, wherein the ripmap gather addresses each comprise an element address in the ripmap and a certain level in the ripmap.

36. The non-transitory computer readable medium according to claim 31, further comprising instructions to calculate an average from the total sum based on the element count in the target subsection.

* * * * *